Jan. 26, 1937.　　　　A. S. HARBOUR　　　　2,069,066
PEDAL PAD
Filed March 7, 1936
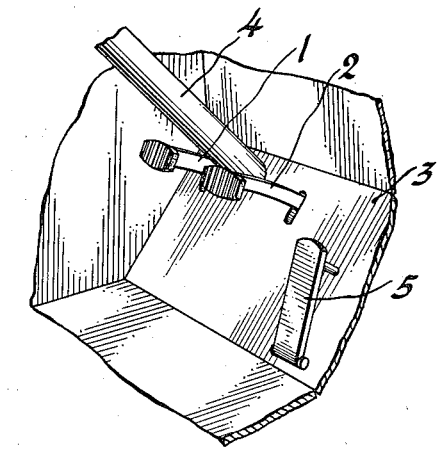
Fig. 1
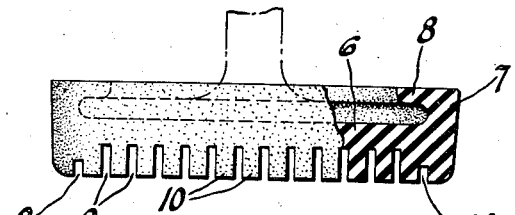
Fig. 2
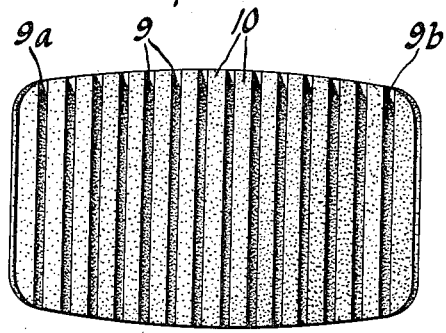
Fig. 3
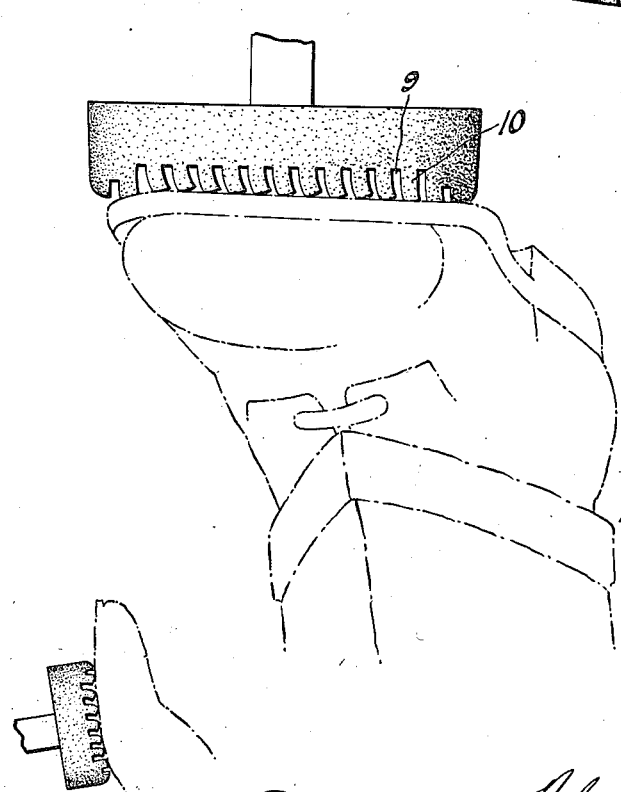
Fig. 4
Fig. 5
Inventor
Albert S. Harbour
By Blackmon, Seevers & Fluck
Attorneys

UNITED STATES PATENT OFFICE 2,069,066

PEDAL PAD

Albert S. Harbour, Pontiac, Mich.

Application March 7, 1936, Serial No. 67,608

3 Claims. (Cl. 74—563)

This invention relates to foot pads of the type molded from rubber and in common use as antislip coverings for automobile clutch and brake pedals. Such pads usually have a ribbed or roughened surface to resist slippage and are generally satisfactory except that the rough surface gradually wears smooth and loses its effectiveness. A more effective and longer wearing surface is afforded according to the present improvement.

Instead of providing merely a roughened surface, there is contemplated a surface made up of a series of coplanar flat surfaces spaced apart and formed on the upper sides of a group of flexible upstanding essentially square cornered fins, separated from one another by relatively deep and narrow cuts or grooves. Thus the foot engaging surface, while broken by the narrow and deeply cut grooves, is flat and in substantial conformity to the sole of a shoe to be applied thereto and tends to cling to the sole upon the application of foot pressure, the several fins or rubber columns bending or buckling to accommodate slight relative movement of the foot on the pedal. The height of the fins is such that the bending occurs within the projecting upstanding columns and upon lateral deflection there may be an overlapping of the fins. In the cocking of the rubber columns the top surfaces tend to become inclined to their normal coplanar relation and the sharp corners along one or the other sides of each column, present a succession of knife edges for increasing resistance to slippage. The elastic resistance to deformation cushions sudden forces thereon and the upper surfaces of the several columns being initially flat wear down uniformly for a prolonged life.

A better understanding of the invention will be had upon reference to the accompanying drawing wherein Figure 1 is a perspective view of a fragment of an automobile body showing the conventional location of the control levers; Figure 2 is a side view partly in section of an improved pad; Figure 3 is a plan view of the foot engaging surface; Figure 4 is a detail view showing a deformation of the foot engaging parts and Figure 5 shows a modification.

While the invention has been particularly designed and will be described herein in connection with treadle pads, the arrangement for insuring a positive grip between cooperating surfaces may be variously applied for analogous uses. The customary arrangement of the operator or driver actuated control devices of an automobile as illustrated in Figure 1, includes a clutch pedal 1 and a brake pedal 2 extending through the floor or toe board 3 in spaced relation and on opposite sides of the steering column 4 and closely adjacent to the brake pedal 2 is the accelerator treadle 5. With this arrangement of parts serious accidents have occurred as a result of a foot slipping from a pedal, especially when it may have been necessary to stop the vehicle in an emergency, and because the slipping foot depressed the accelerator pedal 5 causing the vehicle to pick up speed. To minimize this danger it has been the practice to cover the pedal pad with a rubber boot to frictionally resist slippage and usually the foot engaging surface is ribbed to give increased traction.

According to the present invention the rubber boot is formed as shown in Figures 2 and 3 with a base portion 6 to extend across the face of the pedal pad and this base has a rearwardly projecting rim 7 which terminates with an inwardly extending flange 8 to afford a pocket to receive the marginal edges of the pedal pad and provide a mounting for the rubber boot. The flat foot engaging surface of the boot has extending thereacross a series of relatively deep narrow grooves 9 which may be cut into the face after the molding operation or may be formed during the molding operation by the use of specially designed molds.

The endmost grooves 9a and 9b are not as deep as the intermediate grooves therebetween and this leaves the ends of the pad more resistant to deformation and more particularly makes the sides relatively stiff to insure a firm retention of the boot on the pedal pad through the inturned flange 8. By reason of the several grooves there are formed a succession of flexible columns 10 extending upwardly from the base 6 and terminating in flat top surfaces which extend at substantially right angles to the sides and provide sharp corners along the length of the columns.

These columns being formed from relatively soft rubber and being of a depth and width greater than the width of the narrow grooves 9 afford a series of upstanding fins, each of which is bendable within itself upon the application of thrust on the flat top surface thereof. Force applied to the top faces in the direction of pedal movement is transferred through the flexible columns and the base 6 into the pedal pad and the several flat and narrow faces tend to cling to the surface of the shoe sole to prevent slippage therebetween. Any slight relative movement between the shoe and the pedal either longitudinally or transversely of the cloumn is accommodated without relative slippage by the deformation of the rubber, its elasticity serving in a measure to cushion thrust. Upon severe thrust the several columns will buckle or bend and present their sharp corners as a roughened surface which tends to dig into the surface of the shoe and provide a multiple knife edge effect.

In the modification shown in Figure 5, the spaced flexible columns instead of extending in a direction longitudinally of the vehicle, are arranged transversely, but the structure and action are the same as heretofore described.

I claim:

1. A treadle having a foot pad of soft pliable rubber, said pad having therein a series of spaced and relatively narrow deep grooves across the face thereof and a succession of bendable columns each of a width considerably greater than the width of said grooves but less than the depth of the grooves, whereby to overlie each other upon bending thereof under pressure, said columns having square cornered flat tops which present a succession of knife edges upon the aforementioned bending of the columns.

2. A pedal cap of soft pliable rubber having a pedal pad receiving socket on its underside, and a series of spaced upstanding columns in its upperside, said columns being constructed and arranged for elastic deformation upon the application of pressure to the faces thereof in directions angularly related thereto for the lateral tilting of the columns to accommodate sidewise displacement of said faces and their frictional adherence to the pressure applying surface.

3. A pedal cap of soft pliable rubber having on one side a marginal rib terminating in an inwardly extending retainer flange and defining a pedal pad receiving socket, and in the other side a series of spaced grooves to decrease resistance to deformation and to provide flat faced bendable columns for the application of pressure, the endmost of said grooves in the region of the marginal ribs, being of lesser depth than the intermediate grooves, whereby the ends of the cap are stiffer than the intermediate portion for resisting distention of the pedal pad socket walls.

ALBERT S. HARBOUR.